(12) United States Patent
Takahashi

(10) Patent No.: US 6,477,137 B1
(45) Date of Patent: Nov. 5, 2002

(54) SHUTTER FOR DISK CARTRIDGE AND METHOD FOR PRODUCING SAME

(75) Inventor: Kenji Takahashi, Miyagi (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 07/793,248

(22) Filed: Nov. 12, 1991

Related U.S. Application Data

(63) Continuation of application No. 07/351,206, filed on May 15, 1989, now abandoned.

(30) Foreign Application Priority Data

May 23, 1988 (JP) .............................................. 63-125186

(51) Int. Cl.$^7$ ................................................. G11B 7/26
(52) U.S. Cl. ........................ 369/291; 369/272; 369/288
(58) Field of Search ........................ 360/728, 131–133; 369/272, 287, 288, 289–291

(56) References Cited

U.S. PATENT DOCUMENTS

| | | | | |
|---|---|---|---|---|
| 4,626,949 A | * | 12/1986 | Brock et al. ................. | 360/133 |
| 4,670,802 A | * | 6/1987 | Ogawa et al. .......... | 369/77.2 X |
| 5,021,913 A | * | 6/1991 | Overland et al. ............ | 360/133 |

FOREIGN PATENT DOCUMENTS

| | | |
|---|---|---|
| EP | A - 160 538 | 11/1985 |
| EP | 0 197 590 | 10/1986 |
| EP | A - 215 958 | 4/1987 |
| EP | A239996 | * 12/1987 |
| EP | A - 301 811 | 2/1989 |
| JP | A286190 | * 12/1988 |

OTHER PUBLICATIONS

Patent Abstracts of Japan, vol. 14, No. 64 (P–1002) (4007) Feb. 6, 1990; and JP–A–1 286 190 (Canon) Nov. 17, 1989.

Schutz von Metalloberflächen, "6 Erzeugung von Schutzschichten" pp. 696–708.

* cited by examiner

*Primary Examiner*—Robert E. Nappi
*Assistant Examiner*—Rina I. Duda
(74) *Attorney, Agent, or Firm*—Frommer Lawrence & Haug LLP; William S. Frommer

(57) ABSTRACT

A shutter for a disk cartridge and the method for producing the shutter are provided wherein the shutter is movably attached to a cartridge and has an opening or aperture for exposing at least a portion of the signal recording surface of the disk. The shutter includes cover plates which open or close the aperture and a connecting plate interconnecting these cover plates. A coating is applied to the surfaces of the cover plates. The coating enhances the reflectivity of the cover plates such that impairment of the appearance and corrosion resulting from flaws and contamination can be prevented.

7 Claims, 3 Drawing Sheets

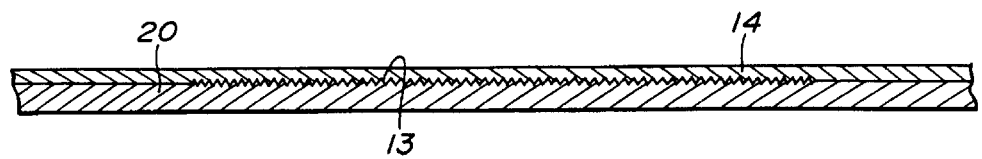
FIG. 4(A)
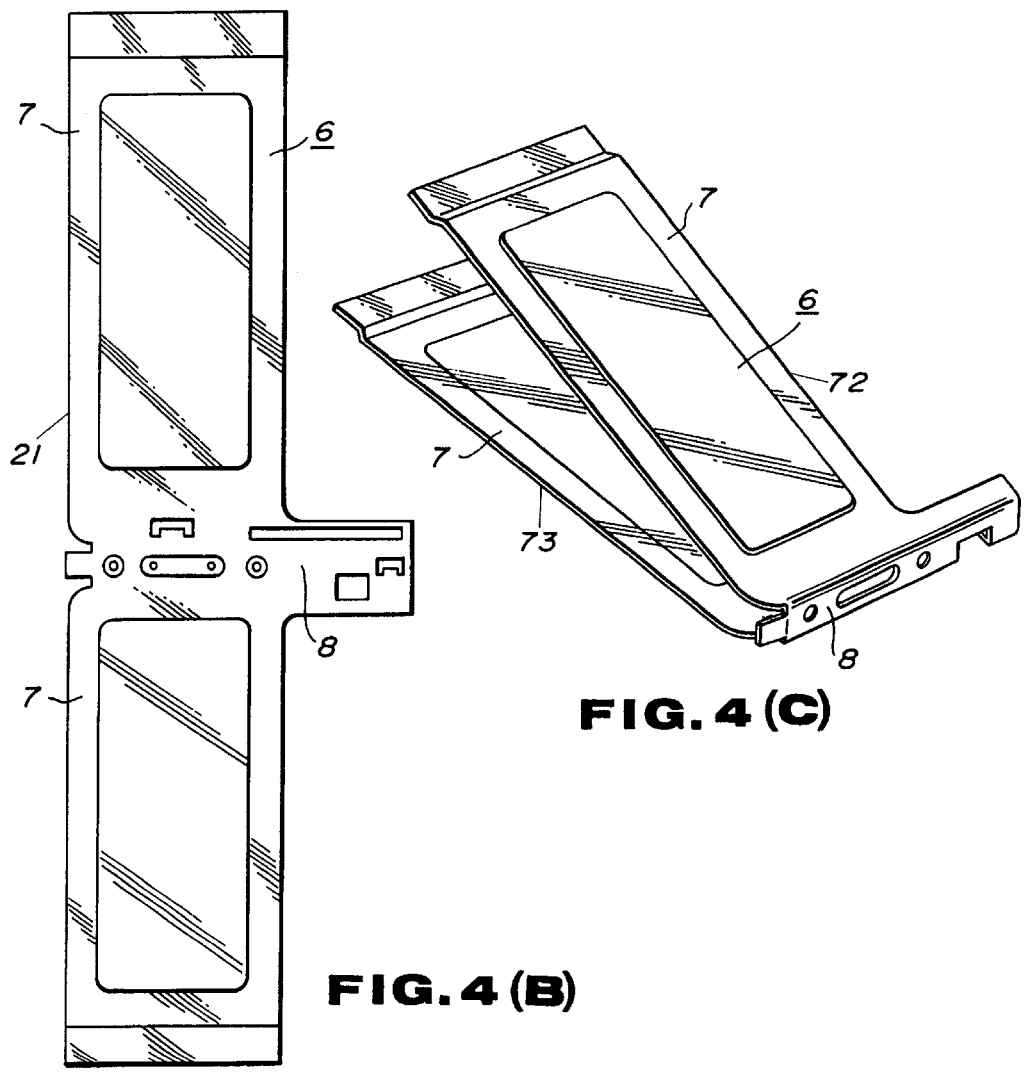
FIG. 4(B)
FIG. 4(C)

SHUTTER FOR DISK CARTRIDGE AND METHOD FOR PRODUCING SAME

This application is a continuation of application Ser. No. 07/351,206, filed May 15, 1989 now abandoned.

BACKGROUND OF THE INVENTION

1. Field of the Invention

This invention relates to a shutter for a disk cartridge and a method for producing the shutter and, more specifically to a shutter which is movably attached to the disk cartridge and has an opening or aperture for exposing at least a portion of the signal recording surface of the disk.

2. Description of the Art

Heretofore, for protecting a disk, such as an optical disk or a magneto-optical disk on which predetermined signals are written, a disk cartridge is employed. Such a disk cartridge is disclosed for example in Japanese Laid-open Patent Nos. 257686/1987 and 61485/1988, wherein the disk cartridge houses the disk and is mounted in position within a recording/reproducing apparatus. The disk cartridge in these Japanese patents is formed by an upper half and a lower half of synthetic resin abutted to each other.

Since the disk cartridge is attached to the recording/reproducing apparatus, in order to house the disk with the cartridge, an opening is formed in each of the opposite planar surfaces of the cartridge. As such, the signal recording surfaces of the disk are exposed along the radial direction and a disk table adapted to drive the disk into rotation can be positioned within the opening. Thus, dust or other contaminants may be introduced into the interior of the cartridge through this opening. Alternatively, during the handling of the disk, cartridge contaminants, such as fats from a fingerprint, may be deposited on the signal recording surface. These contaminants, when deposited on the signal recording surface, may cause dropout of write or read signals at the time of writing and/or reading of information signals.

Thus, a shutter having a U-shaped cross-section is movably fitted and attached so as to lie on both planar surfaces of the cartridge. In this position, the above-noted opening may be closed by the shutter during non-use time when the disk cartridge is not mounted in position within the recording and/or reproducing apparatus.

As disclosed in the U.S. Pat. No. 4,688,206, the shutter is repeatedly moved in connection with the attachment and detachment operation thereof to and from the disk cartridge to thereby open or close the above opening. The shutter is of a size sufficient to cover the opening formed at the transverse center of the cartridge and extends from the center to the front end surface thereof. The shutter has a surface area larger than the surface area of the cartridge. Inasmuch as the shutter is fitted so as to overlie both planar surfaces of the cartridge, the shutter is required to be thin enough to be disposed within the recess formed in each planar surface of the cartridge. This, however, must be accomplished without the shutter projecting from such planar surface, or without increasing the thickness of the cartridge, such that smooth attachment and detachment of the disk cartridge to and from the recording and/or reproducing apparatus is ensured.

That is, it is necessary for the shutter employed in a disk cartridge to have a sufficient mechanical strength even if it is of a smaller thickness. For this reason, the above shutter is made by punching from a thin metal plate, such as stainless steel plate, followed by bending to a U-shaped cross-section.

In making the shutter, it is punched from a metal plate having a smooth surface which has not been subjected to any pre-treatment. For this reason, contaminations deposited become intensified at the time of handling of the disk cartridge. That is, the difference between the gloss proper of the metal plate material and that of the contaminated portions becomes enhanced.

For enhancing the decorative effect of the shutter formed of a metal plate material, it is also known that, the plate surface can be subjected to a so-called hairline processing. This process consists of forming a large number of minute parallel grooves or hairlines on the plate surface. However, in this case, when contaminants are deposited on the shutter surface, the difference in the gloss between the contaminated portions and the uncontaminated portions similarly becomes intensified to detract from the decorative effect associated with hairline processing. Moreover, the hairlines are formed as minute grooves and thus extremely susceptible to being scored.

The flows or scores extending at an angle, including a right angle, with respect to the hairlines, are most noticeable to viewers.

Above all, in the case of a disk cartridge consisting of a cartridge of a synthetic material less susceptible to being scored or contaminated and a shutter of a metallic material being more susceptible to be scored or contaminated, fitted to the cartridge, the overall appearance of the disk cartridge is marred by these scores or contaminants.

The above problem becomes more pronounced with an increase in the diameter of the disk. As the larger the disk diameter, the larger the size of the opening by which the disk is exposed becomes. Accordingly, the size of the shutter adapted for opening or closing the opening is enlarged.

In addition, the shutter formed of a metal material may be corroded starting from the site of the surface scores.

OBJECTS AND SUMMARY OF THE INVENTION

Accordingly, it is an object of the present invention to provide a shutter for a disk cartridge and method for producing a shutter that eliminates the above-noted defects inherent in the prior art.

Another object of the present invention is to provide a shutter for a disk cartridge which is not impaired in appearance by scores or contaminants.

It is yet another object of the present invention to provide a shutter for a disk cartridge which has improved durability through the prevention of corrosion caused by scores or contaminants.

It is a further object of the present invention to provide a shutter for a disk cartridge having improved aesthetic qualities.

It is yet another object of the present invention to provide an improved method for producing a shutter for a disk cartridge which simplifies production of the shutter.

In accordance with an aspect of the present invention, a shutter for a disk cartridge and method for producing the same is provided wherein the cartridge accommodates a disk and is formed within an opening exposing at least a portion of the signal recording surface of said disk. The shutter is movably attached to said cartridge and a pair of cover plates adapted for opening or closing said opening and a connecting plate interconnecting said cover plates.

A coating is applied at least to the surface of the cover plates having a property which enhances the reflectivity of the shutter surface.

According to the present invention, flaws or contaminants caused by fats from fingerprints deposited on the disk become less prominent by the application of the above-described coating to the surface of the cover plates of the shutter. Additionally, with the application of this coating, corrosion is prevented from occurring at the contaminated portions of the disk.

The above and other objects, features, and advantages of the present invention will become apparent from the following illustrative embodiments thereof to be read in conjunction with the accompanying drawings, in which like reference numerals designate the same elements and parts.

BRIEF DESCRIPTION OF THE DRAWINGS

FIGS. 4(A)–(C) illustrates a process for producing the shutter according to the present invention, wherein FIG. 4A is a sectional view illustrating the application of a coating to a metal plate material; FIG. 4B is a plan view showing a plate piece punched from the metal plate material; and FIG. 4C is a perspective view of the plate piece after bending.

DETAILED DESCRIPTION OF PREFERRED EMBODIMENT

Figure 1:
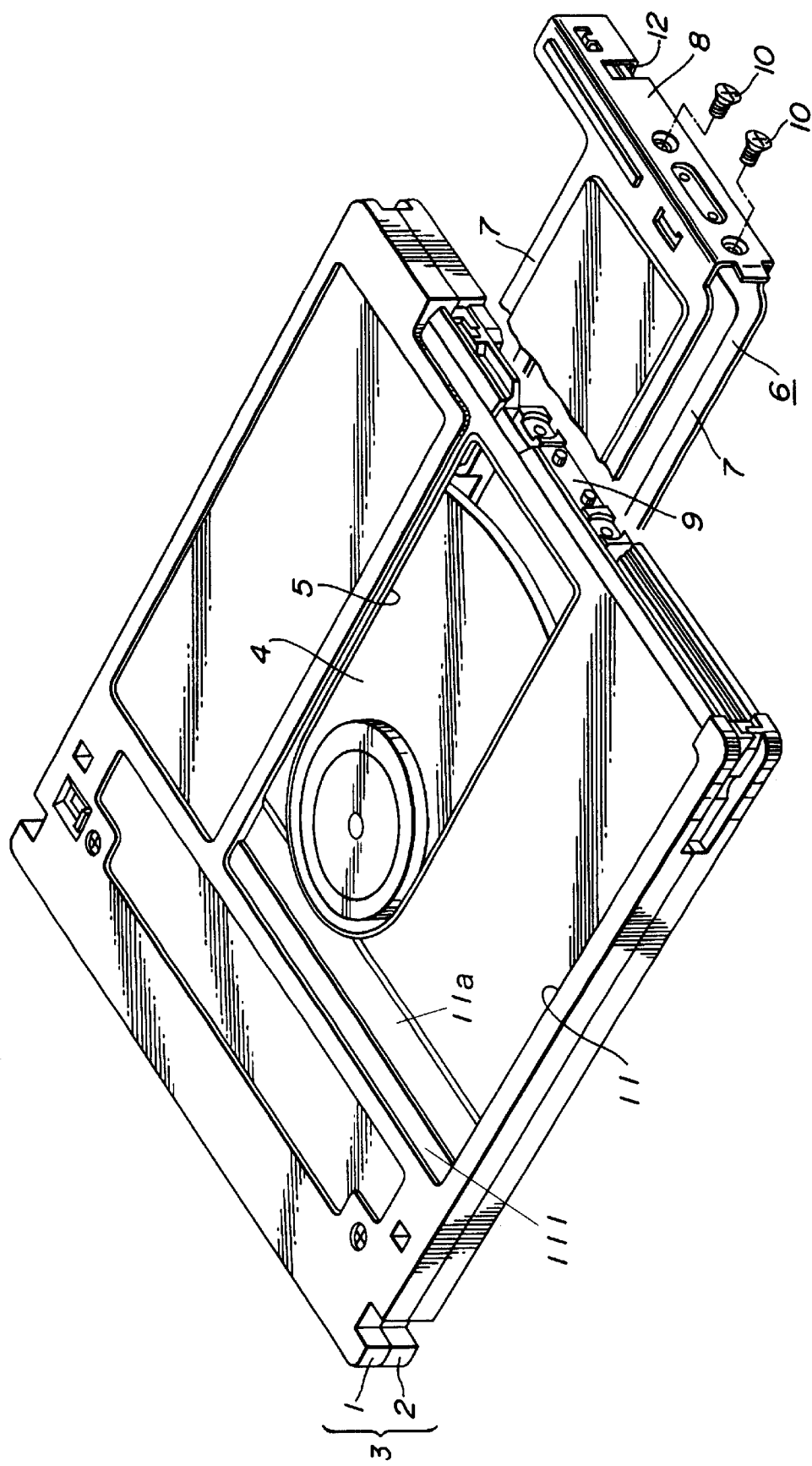
FIG. 1 is a perspective view of a disk cartridge to be fitted with a shutter according to a preferred embodiment of the present invention.

FIG. 1 represents a shutter according to the present invention applied to a disk cartridge.

Referring to FIG. 1, the disk cartridge of the present invention is formed by a cartridge 3 having an upper half 1 formed of a synthetic material and a lower half 2 formed of a synthetic material. The upper and lower halves abut against and are secured to each other. The disk cartridge further includes a disk 4, such as an optical disk or a magneto-optical disk, onto which predetermined information signals are written. In each of the confronting planar surfaces of the cartridge 3, an opening or aperture 5 is formed which allows exposure of the signal recording surface of the disk 4. The disk is housed within the cartridge 3 in the radial direction thereby enabling a disk table of a disk driving unit to provide for rotation of the disk.

Figure 2:
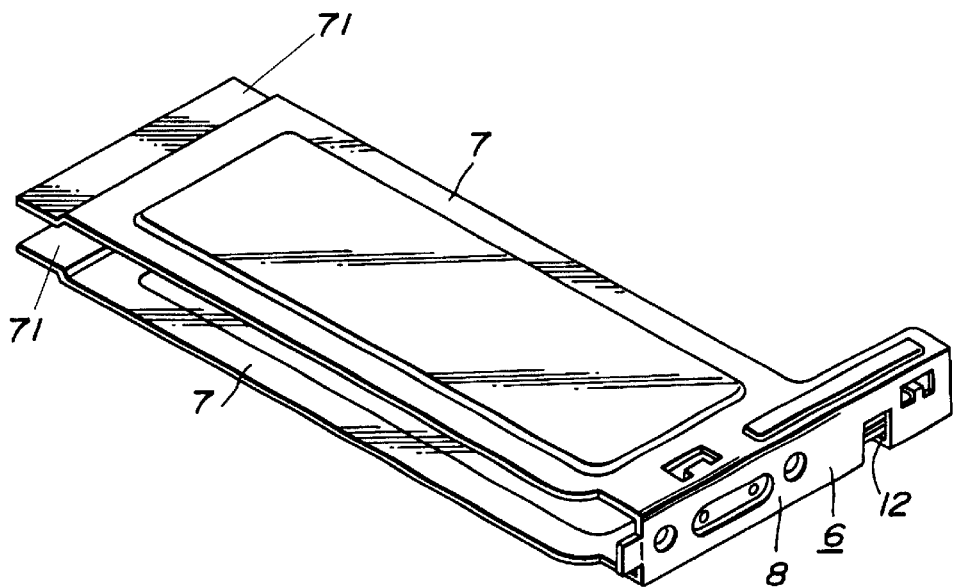
FIG. 2 is a perspective view of the shutter fitted with the disk cartridge of FIG. 1.

In order to close the apertures 5 while the disk cartridge 3 is not in use, a shutter 6 is movably mounted to the cartridge 3. This shutter 6 is formed from a metal plate, such as thin stainless steel plate, as shown in FIGS. 1 and 2. That is, the shutter 6 is formed by a pair of cover plates 7, 7 of a size sufficient to cover the apertures formed in both planar surfaces of the cartridge 3 secures plate 8 connecting the end edges of the plates 7, 7 to one another in generally a U-shape. This shutter 6 is secured to the cartridge 3 in recesses 11 formed in both planar surfaces of the cartridge 2. The shutter is movable, within the recesses 11 between the closed position of the aperture 5 and the opened, exposed position of the apertures 5. The sides of the cover plates 7, 7 of the shutter 6 remote from the connecting plate 8 are formed with bent portions 71, 71 (See FIG. 2) which are introduced into a channel-shaped groove defined between steps 11a continuous to the recesses 11 and guide plates 111 (FIG. 1) provided above these steps 11a.

The shutter is movably mounted to the cartridge 3 in this position as a result of the connecting plate 8 being secured with set screws 10 to a slider 9 which is slidably supported on the front end surface of the cartridge 3. The connecting plate 8 of the shutter 6 is provided with an opening 12 into which an engaging pin (not shown), of a shutter opening and closing unit is engaged. This unit is adapted for opening and closing the shutter 6 on attachment of the disk cartridge to the recording and/or reproducing device. More specifically, the shutter 6 is normally locked by the shutter locking means (not shown) at a position closing opening 5. However, when the engaging pin of the shutter opening and closing unit is engaged in the opening 12, the engagement between shutter locking means and the shutter 6 is released such that the shutter 6 is movable between positions opening or closing the apertures 5.

Figure 3:
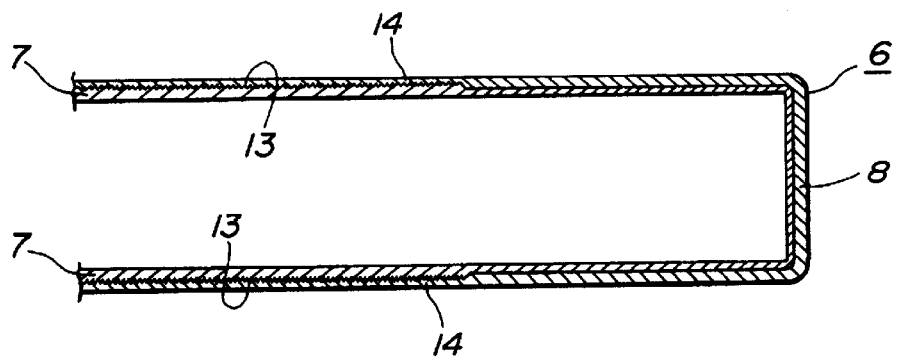
FIG. 3 is a longitudinal sectional view of the shutter of FIG. 2.

Referring to FIG. 3, the surface of the cover plates 7, 7 of the shutter 6 are subjected to so-called hairline processing, whereby minute grooves or hairlines 13 are formed by matching the cover plates parallel to one another. In addition, a coating 14 is applied on the overall surface of the shutter 6, including the surface of the cover plates 7, 7. This coating 14 has a property which increases the reflectivity of the cover plates 7, 7. The coating is formed by the application of an epoxy or acryl type resin paint which is subsequently baked. The surfaces of the cover plates 7. 7 are thus provided with the coating 14 which increases the reflectivity of the cover plates and thus has an improved glossiness.

The cover plates 7 of the shutter 6 are provided with raised portions 72, 73, which are formed as by press working while the shutter 6 is in the developed state as indicated in FIG. 4B.

The shutter 6 having the coating 14 applied thereto is manufactured by the following sequence of operations.

As shown in FIG. 4(A), the coating 14 is first applied to the surface of a thin metal plate material 20, such as a thin stainless steel plate, on which the hairlines 13 are previously formed by a decorative machining operation. A plate piece 21 (See FIG. 4(B)) having a contour corresponding to that of the shutter 6 is punched from this plate material 20. This plate piece 21 is then folded (FIG. 4) so that the coating 14 faces to the outer side and forms the shutter 6 having a pair of cover plates 7, 7 and a connecting plate 8. Alternatively, the coating 14 may be applied after formation of the shutter 6. When the coating 14 is applied in this manner after formation of the shutter 6, the coating may only be applied to intended coating regions.

Generally the coating should be applied at the least to those surfaces of the cover plates that are apparent to viewer. Additionally, the resin coating may be suitably applied to the surface of the connecting plate depending upon the coating conditions for the resin paint at the time of formation of the coating 14.

From the foregoing, a shutter is provided wherein at least the predominant surfaces of the cover plates of the shutter are coated with a coating which enhances the reflectivity of the cover plates. Accordingly, flaws or contaminants caused by fats from fingerprints are made less prominent to viewers while also preventing corrosion resulting from such flaws or to thereby improve the durability of the system.

The coating may be applied most easily after the shutter is formed from a metal plate material by previously providing the shutter with the coating. This avoids complications in the shutter manufacture process otherwise incurred by the application of the coating.

In addition, only the intended coating portions of the shutter may be reliably provided with the coating after the shutter has been.

Although illustrative embodiments of the present invention have been described in detail above with reference to the accompanying drawings, it is to be understood that the invention is not limited to those precise embodiments, and that various changes and modifications can be effected therein by one skilled in the art without departing from the scope or spirit of the invention, as defined by the appended claims.

What is claimed is:

1. A recording/reproducing apparatus having a disk cartridge accommodating a disk and including apertures for exposing at least a portion of a signal recording surface of said disk, and a metal shutter movably attached to said cartridge and comprising a pair of cover plates adapted for selectively opening and closing said apparatus and having outer surfaces facing away from said cartridge, a connecting plate interconnecting said cover plates, and a coating which increases the reflectivity of said shutter and which is applied to substantially all of said outer surfaces of said cover plates for making less prominent to view fingerprints formed on said metal shutter.

2. Recording/reproducing apparatus according to claim 1; in which said outer surfaces of the cover plates have decoratively machined hairlines underlying said coating.

3. Recording/reproducing apparatus according to claim 1 in which said coating is an epoxy type resin paint.

4. Recording/reproducing apparatus according to claim 1 in which said coating is an acryl type resin paint.

5. A method for manufacturing a metal shutter for a disk cartridge accommodating a disk and having apertures for exposing at least a portion of a signal recording surface of said disk, said shutter being movably mounted on said cartridge and comprising a pair of cover plates for selectively opening and closing said apertures and a connecting plate interconnecting said cover plates, said method comprising:

applying on substantially all of one side of a metal plate material a coating which increases the reflectivity of said material;

punching said metal plate material to form a plate piece in the configuration of said shutter; and bending the plate piece to form said cover plates and the connecting plate with said coating at outer surfaces thereof facing away from the disk cartridge for making less prominent to view fingerprints formed on said metal shutter.

6. A method for manufacturing a flat configuration metal shutter for a disk cartridge accommodating a disk and having apertures for exposing at least a portion of a signal recording surface of said disk, said shutter being movably mounted on said cartridge and comprising a pair of cover plates selectively opening and closing said apertures and a connecting plate interconnecting said cover plates, said method comprising:

punching a metal plate material to form therefrom a metal plate piece in the flat configuration of said shutter;

bending the flat metal plate piece so that outer lateral side portions thereof form said cover plates and the remainder of said flat metal plate piece forms said connecting plate;

applying to substantially all of the outwardly facing surfaces of said cover plates a coating which increases the reflectivity of said metal plate material for making less prominent to view fingerprints formed on said metal shutter.

7. A metal shutter movably attached to a disk cartridge having apertures for exposing a disk in said cartridge, said shutter comprising a pair of metal cover plates having portions thereof adapted for selectively opening and closing the apertures and a metal connecting plate interconnecting said cover plates, said cover plates having outer surfaces facing away from said disk cartridge, and a coating applied to substantially all of said outer surfaces of said cover plates and increasing the reflectivity of said outer surfaces for making less prominent to view fingerprints formed on said metal shutter.

* * * * *